United States Patent [19]

Ohshima et al.

[11] Patent Number: 4,925,272
[45] Date of Patent: May 15, 1990

[54] INDICATION DISPLAY UNIT FOR VEHICLES

[75] Inventors: Tsuyoshi Ohshima; Kunimitsu Aoki, both of Susono, Japan

[73] Assignee: Yazaki Corporation, Tokyo, Japan

[21] Appl. No.: 307,722

[22] Filed: Feb. 8, 1989

[30] Foreign Application Priority Data

Feb. 15, 1988 [JP] Japan ............................ 63-17463[U]
Feb. 15, 1988 [JP] Japan ............................ 63-17464[U]

[51] Int. Cl.$^5$ ........................................... G02B 27/12
[52] U.S. Cl. ................................... 350/174; 340/705
[58] Field of Search ............... 350/174, 169; 340/705, 340/980

[56] References Cited

U.S. PATENT DOCUMENTS

| | | | |
|---|---|---|---|
| 3,274,545 | 9/1966 | Bowles et al. | 340/705 |
| 4,635,033 | 1/1987 | Inukai et al. | 340/705 |
| 4,636,782 | 1/1987 | Nakamura et al. | 340/705 |
| 4,687,072 | 8/1987 | Kumuro | 340/705 |
| 4,804,836 | 2/1989 | Iino | 340/705 |

FOREIGN PATENT DOCUMENTS

| | | | |
|---|---|---|---|
| 0278395 | 8/1988 | European Pat. Off. | 340/705 |
| 60-192912 | 1/1985 | Japan . | |
| 0183240 | 9/1985 | Japan | 340/705 |
| 60-192919 | 10/1985 | Japan . | |
| 0139728 | 6/1987 | Japan | 340/705 |

*Primary Examiner*—Bruce Y. Arnold
*Assistant Examiner*—R. D. Shafer
*Attorney, Agent, or Firm*—Armstrong, Nikaido, Marmelstein, Kubovcik & Murray

[57] ABSTRACT

An indication display unit for a vehicle comprises an indicating device provided in a dash board and a reflecting device provided thereon. An indicated image is reflected on the reflecting device so as to be visibly observed by a driver in superposition on an external front view through a windshield. A shifting device of the indicated image is provided for moving a projecting position thereof in accordance with the velocity of a vehicle. The indication display unit of the above structure can be divided in two types; a direct image projecting type and an indirect projecting type. The respective type can be defined as the indication display unit provided with an indicated image shifting device. By using the above display unit, the position of the displayed image to be observed can be shifted in accordance with the vehicle speed, whereby the visibly observable range by a driver can be greatly enlarged without moving the position of the driver's viewing point.

4 Claims, 4 Drawing Sheets

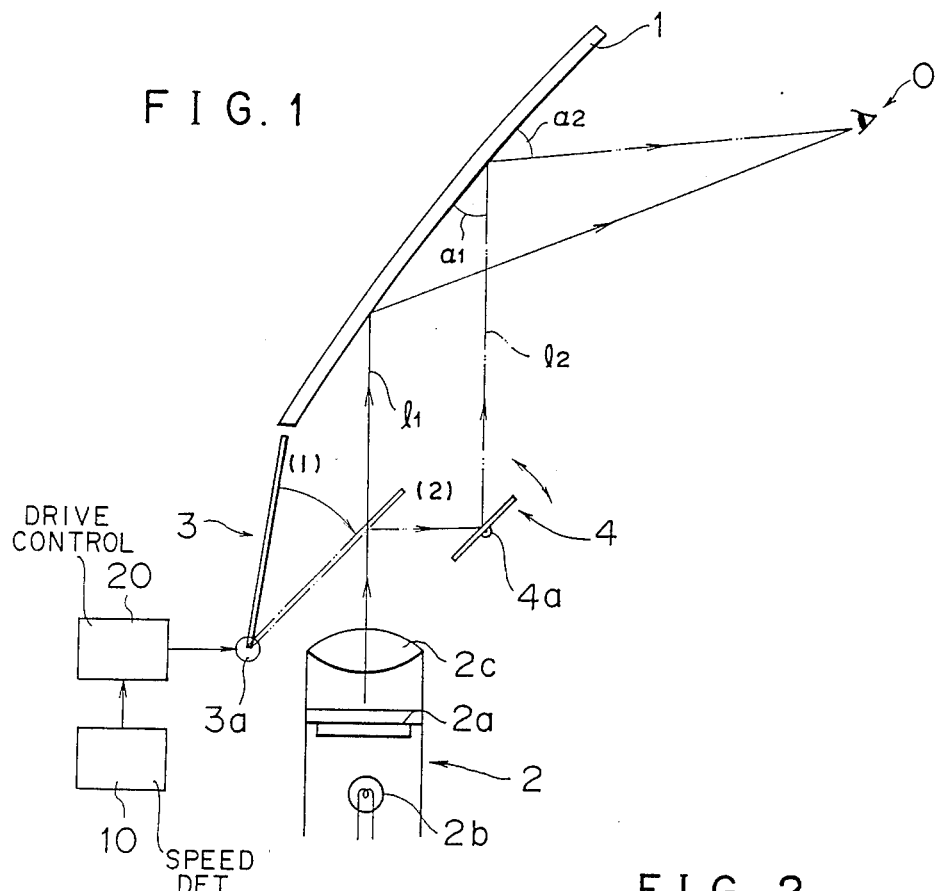
FIG. 1
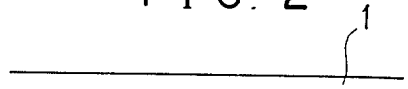
FIG. 2
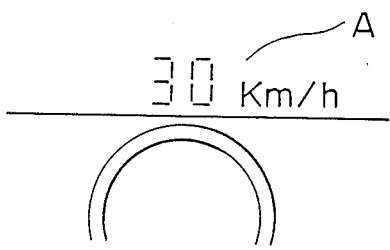

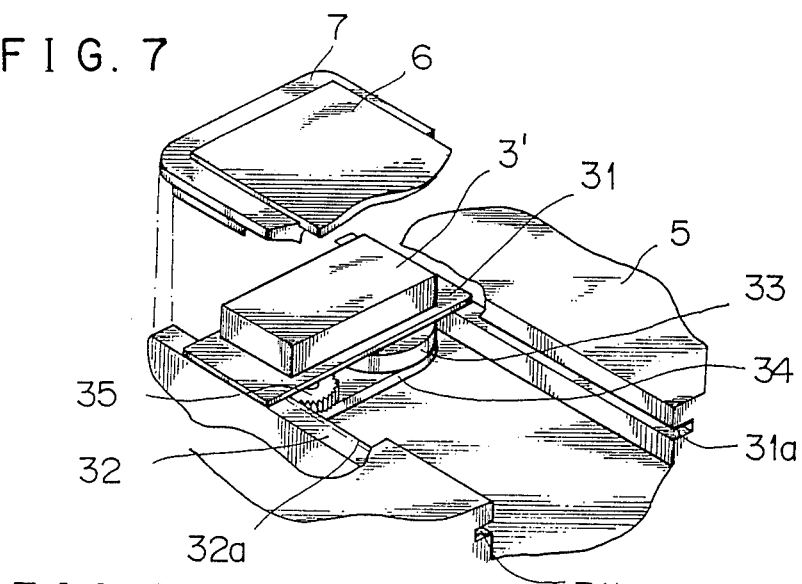
FIG. 7
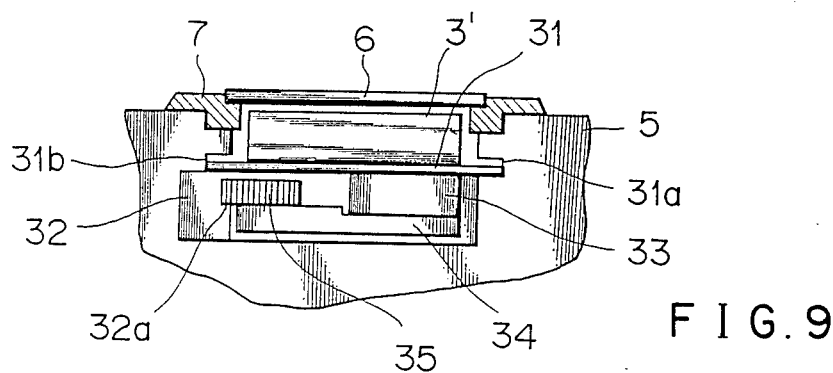
FIG. 8
FIG. 9
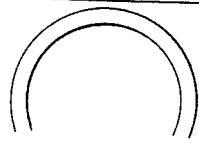

INDICATION DISPLAY UNIT FOR VEHICLES

BACKGROUND OF THE INVENTION

1. Field of the Invention

The present invention relates to indication display units for vehicles, and more particularly to an indication display unit for vehicles which uses a so-called head-up display wherein an image indicated by an indicating unit is reflected on a reflecting surface such as an windshield, so that a virtual image is superposed on a front view outside therethrough.

2. Description of the Prior Art

Conventionally, there have been proposed various indication display units for vehicles in use of a head-up display as described above, wherein vehicle information such as vehicle speed, driving distance and the like are visibly observed by a driver without averting his eyes from a sight ahead during the driving of a vehicle.

However, generally, the driver's sight varies according to the velocity during the driving. For example, as shown in FIGS. 5A and 5B, the visibly observable range S at high speed (FIG. 5A) is narrower than the range S' at low speed (FIG. 5B).

Accordingly, there gives rise to a problem when a position of an indicated image, reflected on an windshield or the like, is set to a peripheral position of the visible range S' normally observed at low speed, the indicated image is greatly deviated from the visible range S normally observed at high speed, which causes a difficulty for observing the image. When a position of an indicating image is set to a peripheral position of the range S at high speed, the indicated image is to be positioned in the vicinity of a center of the range S' which can trouble the driver.

For solving the aforementioned problem, an indication display unit for vehicles has been proposed, wherein a projector for projecting an indicated image is rotated to vary a position of the indicated image according to the driving speed (Japanese Patent Laid-open No. 192912/1985).

FIG. 4 shows the above-described conventional indication display unit. A projector 2 has a casing 21 which encases therein an indicating unit 22, a filter 23 and a convex lens 24. An indicated image by the indicating unit 22 is projected on an windshield 1 through the filter 23 and the convex lens 24, and a virtual image X thereof is observed in superposition on an external front view through the windshield 1.

The projector 2 is mounted rotatably about a supporting member 26, wherein at low speed, force is applied from the direction such as indicated by arrow A, while at high speed, force is applied from the direction as indicated by arrow B so that a projecting position on the windshield is moved according to the vehicle speed.

However, according to the above-described conventional apparatus, a projector or the like is rotated to vary an image projecting position thereby an optical axis L directed to the projecting direction is radially moved substantially about one point. Therefore, as shown in FIG. 3, an incident angle $\theta$ with respect to the windshield 1 greatly varies as the optical axis L moves, and the reflecting direction thereof greatly varies in a direction of a or a' as viewed in FIG. 3.

Accordingly, there poses a problem in that the range (d in FIG. 3) in which the driver can visibly observe a displayed image without moving the driver's eye position is very narrow and the range in which the displayed image can be shifted is substantially narrow, and as a result the effect normally acquired by the shifting operation of the displayed position according to the vehicle speed as described above cannot be sufficiently obtained.

SUMMARY OF THE INVENTION

It is therefore an object of the present invention to provide an indication display unit for vehicles in which an image displaying position is moved according to a vehicle speed, and the moving range of the display position is substantially enlarged.

In a first preferred embodiment of the present invention, there can be provided an indication display unit for vehicles, wherein a reflecting member provided on a dash board reflects an indicated image so as to be observed in superposition on an external front view through the windshield 1, characterized by comprising a tiltable type reflecting plate mounted between the indicating unit and the reflecting surface to reflect an indicated image projected therefrom, and a second reflecting plate for reflecting the projected image reflected by the above tiltable type reflecting plate towards the reflecting surface thereof, wherein when the vehicle speed is in a predetermined range, the tiltable type reflecting plate is tilted to vary a projecting position of the indicated image with respect to the reflecting surface.

In the above-described preferred embodiment, when the tiltable reflecting plate is selectively tilted in the predetermined speed range of the vehicle speed, the projected image from the indicating unit is reflected thereon and again reflected by the second reflecting plate to be observed on the reflecting surface of the reflecting means such as an windshield or the like.

In this situation above, the optical axis of the projected image on the reflecting surface of the reflecting member is moved substantially parallel with the optical axis when the tiltable reflecting plate is not tilted, and therefore, the projecting position of the indicated image is moved without greatly changing the incident angle with respect to the reflecting surface.

In a further preferred embodiment of the above-described indication display unit for vehicles, there can be provided an arrangement characterized by comprising a shifting device for moving the indicating unit parallel with the upper surface of the dash board in accordance with the vehicle speed, wherein the shifting device moves the indicating unit in accordance with the vehicle speed whereby the position of a displayed image reflected on the reflecting surface of the reflecting member such as the windshield is also displayed.

Features of the invention will be more fully understood from the following detailed description and appended claims when taken with the accompanying drawings.

BRIEF DESCRIPTION OF THE DRAWINGS

FIG. 1 illustrates an indication display unit for vehicles according to a preferred embodiment of the present invention;

FIG. 2 is an exemplary illustration of a displayed image on the reflecting surface of the preferred embodiment;

FIG. 7 is a partial perspective view showing a display device according to the embodiment;

FIG. 8 is a sectional side view of the part shown in FIG. 7; and

FIG. 9 is an exemplary illustration similar to FIG. 2 in the embodiment.

DETAILED DESCRIPTION OF THE PREFERRED EMBODIMENTS

Figure 3:
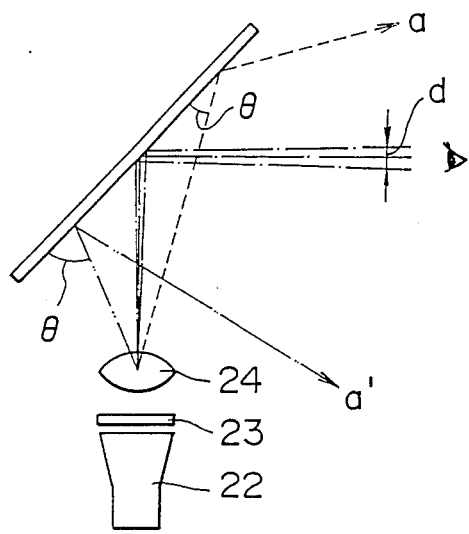
FIG. 3 is an exemplary illustration of the task to be solved by the present invention.
Figure 4:
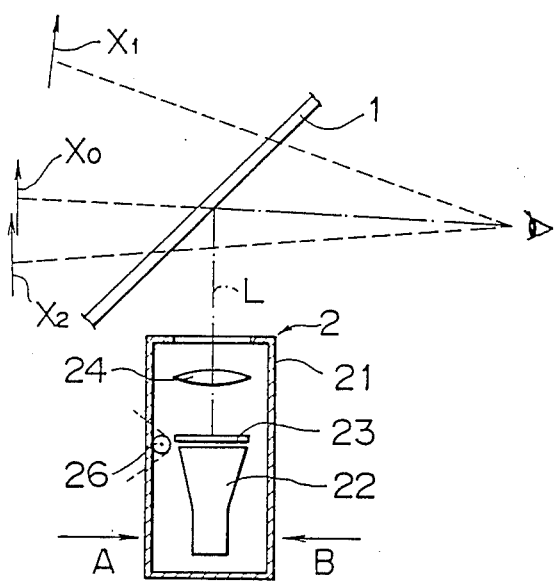
FIG. 4 illustrates an example of a conventional type display unit in use of a head-up display.
Figure 5A:
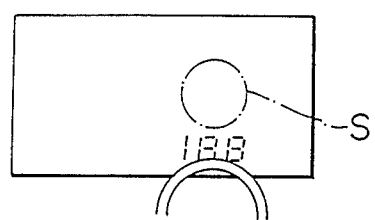
FIGS. 5A and 5B are exemplary illustrations of a variation of the visibly observable range in accordance with a variation of vehicle speed.
Figure 5B:
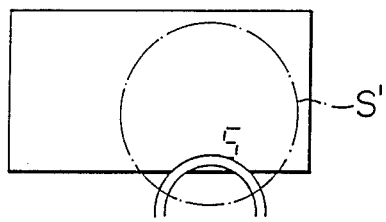

First Embodiment:

FIG. 1 shows an indication display unit for vehicles according to a first embodiment of the present invention, wherein reference numeral 1 designates an windshield, and 2 denotes an image projector disposed within a dash board (not shown). This projector 2 is provided so that an indicated image displayed on a transmissive type liquid crystal display unit 2a encased therein is transmitted by a light source 2b, and the displayed image is projected in the direction of the windshield 1 by means of a lens 2c.

A tiltable mirror denoted by 3 is rotated about a supporting shaft 3a which is activated to rotate by a mirror driving section 20 connected to a speed detection means 10 such as a vehicle speed sensor.

A second mirror denoted by 4 is rotated about a supporting shaft 4a, an inclination angle of which can be fine-adjusted.

When the vehicle is moving at low speed (for example, less than 50 km/h), the mirror driving section 20 detects that the vehicle speed is in a region of low speed in accordance with the output of the speed detection means 10 to hold the tiltable mirror 3 at a position (1) in FIG. 1. Thereby, the image generated by the projector 2 is directly projected to the surface of the windshield 1, and when observed from the viewing point 0, a displayed image A such as a vehicle speed is visibly observed at the lower portion of the windshield 1 as shown in FIG. 2.

On the other hand, when the vehicle is moving at high speed (50 km/h or more), the mirror driving section 20 detects the fact that the vehicle speed is in a region of high speed according to the speed detection means 10 so as to tilt the tiltable mirror 3 to a position (2) in FIG. 1. The displayed image from the projector 2 is then reflected by the tiltable mirror 3 and again reflected by the second mirror 4 to be projected on the surface of the windshield 1.

In this situation above, the optical axis $l_2$ of the projected image reflected on the windshield 1 from the second mirror 4 is moved substantially parallel with the optical axis $l_1$ of the projected image reflected on the windshield 1 from the projector 2, and therefore, the projecting position of the indicated image is moved without greatly changing the incident angle with respect to the reflecting surface, whereby the reflected image thereon moves towards the viewing point O.

Since the angle of the reflecting surface of the second mirror 4 can be fine-adjusted, angles $\alpha_1$ and $\alpha_2$ respectively observing the projected positions from the second mirror 4 and the viewing point O with respect to the windshield 1 are made equal to each other, and the indicated image projected from the second mirror 4 can be visibly observed at the point O.

As viewed from the point O, a displayed image A' may be observed at the substantially central position of the windshield 1 as shown in FIG. 2.

As described above, the projecting position is selectively changed in accordance with the speed range of the moving vehicle, and the visibly observable range from a driver without moving his eye's position can be greatly enlarged

Figure 6:
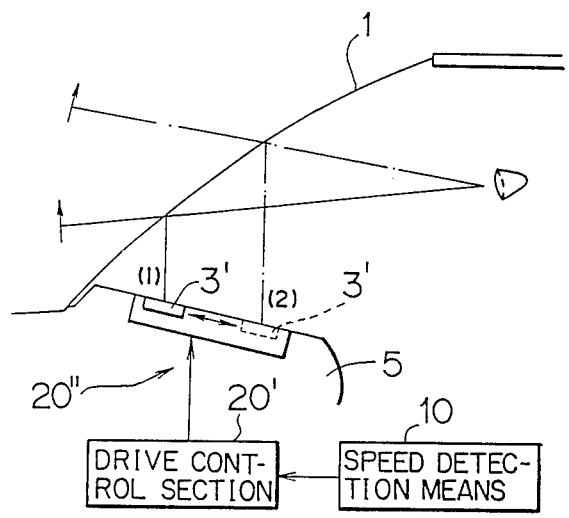
FIG. 6 illustrates an indication display unit for vehicles according to a further preferred embodiment of the present invention.

Second Embodiment:

FIG. 6 shows an indication display unit for vehicles according to the second embodiment of the present invention, wherein reference numeral 1 designates an windshield, 5 a dash board, 3' a display device such as VFT disposed on the upper surface of the dash board 5, and 20" a shifting means for moving the display device 3' on the upper surface of the dash board 5 according to the vehicle speed.

FIG. 7 is a partial perspective view showing the display device 3', and FIG. 8 is a sectional side view thereof.

The display device 3' is mounted on a movable plate 31, whose shorter ends are slidably embedded in respective rail grooves 31a and 31b formed in the dash board 5. A lower side surface of the rail groove 31b is formed by a rack 32 in which a linear type gear 32a is formed on the opposite side to the rail groove 31a.

Mounted under the movable plate 31 are a motor 33, a gear box 34 encasing a gear connected to the motor 33 and a driving gear 35 connected to the gear box 34 and supported on the movable plate 31, the driving gear 35 being engaged with the linear type gear 32a of the rack 32.

When the motor 33 is activated, the driving gear 35 is rotated through the gear box 34, and the display device 3', the movable plate 31, the motor 33 and so forth are integrally moved along the rail grooves 31a and 31b.

On the display device 3', a surface glass 6 is mounted on the dash board 5 by a cover 7 for covering the moving range thereof.

The motor 33 is activated and controlled by a drive control section 20' which detects a vehicle speed by a speed detection means 10 such as a vehicle speed sensor.

The drive control section 20' controls the motor 33 so that the display device 3' is moved within the predetermined range and stores the present vehicle speed whether in a region of high speed or low speed, whereby when the speed region is changed, the driving direction of the motor 33 is selected to move the display device 3' according to the predetermined amount. It is to be noted that the moving direction and the moving range of the display device 3' may be decided by use of a sensor or the like for detecting a position of the display device 3'.

When the vehicle moving at low speed (for example, less than 50 km/h), the drive control section 20' detects that the vehicle speed is in the low speed region in accordance with the output of the speed detection means 10 to activate the motor 33 to move the display device 3' towards the windshield 30 (a position (1) in FIG. 6). On the other hand, when the vehicle is moving at high speed (50 km/hr or more), the drive control section 20' likewise detects that the vehicle speed is in the high speed region to activate the motor 33 to move the display device 3' towards the driver's seat (a position (5) in FIG. 6).

Accordingly, as shown in FIG. 9, at low speed, the displayed image B for the vehicle speed or the like is observed at the lower portion of the windshield 1', whereas at high speed, the displayed image B' is observed at a substantially central portion of the windshield 1:

While in the above-described embodiment, the indicated image has been reflected on the windshield, it is to be noted of course that a reflecting plate such as a semitransparent mirror disposed substantially parallel with an windshield may be used to reflect the indicated image on the reflecting plate.

The indication display unit according to the present invention which has been described in detail above has the following effects.

When the vehicle speed is in the predetermined range, the indicated image by the indicating unit is indirectly projected on the reflecting surface of the windshield or the like by the tiltable type reflecting plate and also by the second reflecting plate whereas when the vehicle speed is not in the above described range, the indicated image is directly projected to the reflecting surface whereby the projecting position of the indicated image is moved without greatly changing the angle of incidence with respect to the reflecting surface. Therefore, an image displaying position can be moved according to the vehicle speed and the moving range of the displaying position can be greatly enlarged.

Further, according to the second embodiment, the display unit is moved parallel with the upper surface of the dash board according to the vehicle speed. Therefore, the position of the displayed image to be observed can be shifted according to the vehicle speed, and the moving range of the displaying position visibly observable by a driver can be enlarged without moving the position of the viewing point.

What is claimed is:

1. An indication display unit for a vehicle comprising:
   indicating means, installed in a dash board, for providing an image thereon indicative of driving information;
   partial reflector means, disposed forwardly of a driver of the vehicle, for reflecting said image at a first vehicle position toward the driver;
   a first mirror pivotable, depending on a vehicle speed, between a raised position and a tilted position, said indicating means directing said image, on a first optical axis, toward a first vertical position when said first mirror is in the raised position, said first mirror blocking the first optical axis to reflect said image when said first mirror is in the tilted position;
   a second mirror, installed opposite said first mirror, to reflect the image, reflected by the first mirror, on a second optical axis toward the partial reflector means when said first mirror is in the tiled position, said partial reflector means further reflecting said image at a second vertical position toward the driver.

2. An indication display unit according to claim 1, wherein said partial reflector means includes a windshield of said vehicle.

3. An indication display unit according to claim 1, wherein said indicating means and said first and second mirrors are arranged such that said first and second optical axes are substantially parallel.

4. An indication display unit according to claim 1, wherein said second mirror is for pivotal fine adjustment.

* * * * *